United States Patent
Hager et al.

(10) Patent No.: US 12,542,689 B2
(45) Date of Patent: Feb. 3, 2026

(54) METHOD FOR ASSIGNING ELECTRICAL SIGNALS IN A NETWORK

(71) Applicant: PEPPER MOTION GMBH, Denkendorf (DE)

(72) Inventors: Andreas Hager, Aichach (DE); Matthias Kerler, Munich (DE); Philipp Steininger, Germering (DE); Jennifer Schlindwein, Waldbüttelbrunn (DE)

(73) Assignee: PEPPER MOTION GMBH, Denkendorf (DE)

( * ) Notice: Subject to any disclaimer, the term of this patent is extended or adjusted under 35 U.S.C. 154(b) by 163 days.

(21) Appl. No.: 18/271,137

(22) PCT Filed: Dec. 23, 2021

(86) PCT No.: PCT/EP2021/087579
§ 371 (c)(1),
(2) Date: Jul. 6, 2023

(87) PCT Pub. No.: WO2022/152547
PCT Pub. Date: Jul. 21, 2022

(65) Prior Publication Data
US 2023/0403172 A1    Dec. 14, 2023

(30) Foreign Application Priority Data
Jan. 14, 2021 (DE) ............... 10 2021 100 656.2

(51) Int. Cl.
*H04L 12/10* (2006.01)
(52) U.S. Cl.
CPC ................... *H04L 12/10* (2013.01)
(58) Field of Classification Search
CPC . H04L 12/10; H04L 12/40; H04L 2012/0215; H04L 2012/40273
See application file for complete search history.

(56) References Cited

U.S. PATENT DOCUMENTS

| | | | |
|---|---|---|---|
| 11,251,989 B2 * | 2/2022 | Walrant | H04L 69/18 |
| 2014/0334568 A1 * | 11/2014 | Gotou | H04B 3/548 |
| | | | 375/271 |
| 2024/0364784 A1 * | 10/2024 | Gehrmann | H04L 12/40 |

FOREIGN PATENT DOCUMENTS

| | | |
|---|---|---|
| DE | 196 43 410 A1 | 6/1998 |
| DE | 10 2014 211 851 A1 | 12/2015 |

OTHER PUBLICATIONS

International Search Report, issued in PCT/EP2021/087579, dated May 2, 2022.

(Continued)

*Primary Examiner* — Kim Huynh

(74) *Attorney, Agent, or Firm* — Birch, Stewart, Kolasch & Birch, LLP

(57) ABSTRACT

A method in which electrical signals are assigned in a network includes generating first signals from data sources; generating second signals from the data sources; assigning the second signals by comparing with first signals and/or with differences of the second signals in data traces for the second signal based on network states; if a number of unassigned second signals after assigning is zero, terminating assigning the second signals; if the number is greater than zero after assigning, generating further first and second signals with modified network states and/or output conditions and assigning by comparing the further second signals with the first signals and/or with differences of the further second signals in data traces for the second signal due to network states.

19 Claims, 8 Drawing Sheets

(56) References Cited

OTHER PUBLICATIONS

Figure 1:
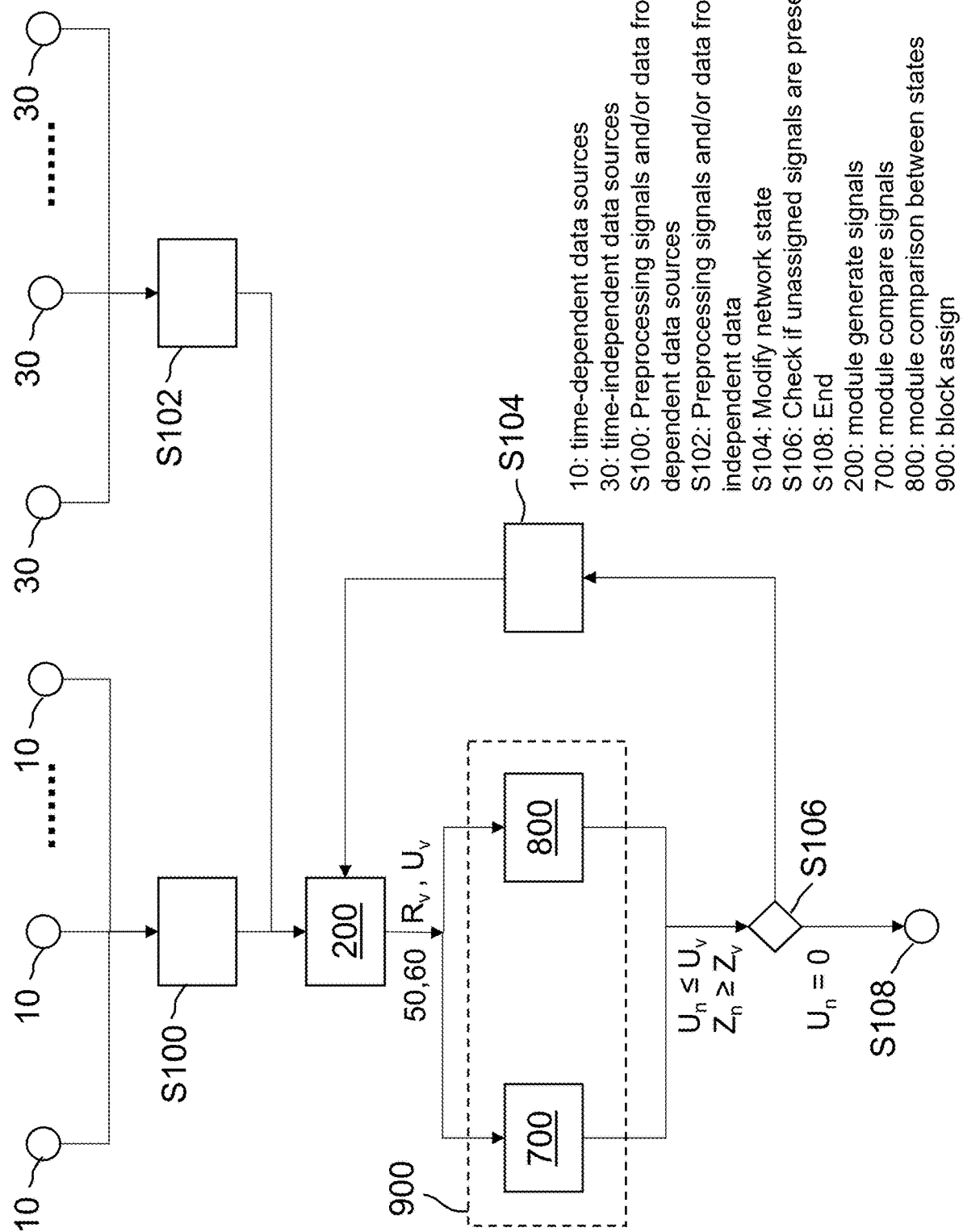

Pesé et al., "LibreCAN: Automated CAN Message Translator", CCS '19, Nov. 11-15, 2019, London, United Kingdom, Session 10A: Cyberphysical Security, pp. 2283-2300.
Verma et al., "CAN-D: A Modular Four-Step Pipeline for Comprehensively Decoding Controller Area Network Data", arxiv.org, Cornell University Library, 201 Olin Library Cornell University Ithaca, NY 14853, Jun. 10, 2020, total 15 pages.
Written Opinion of the International Searching Authority, issued in PCT/EP2021/087579, dated May 2, 2022.
Young et al., "Towards Reverse Engineering Controller Area Network Messages Using Machine Learning", 2020 IEEE 6th World Forum on Internet of Things (WF-IOT), IEEE, Jun. 2, 2020, pp. 1-6.

\* cited by examiner

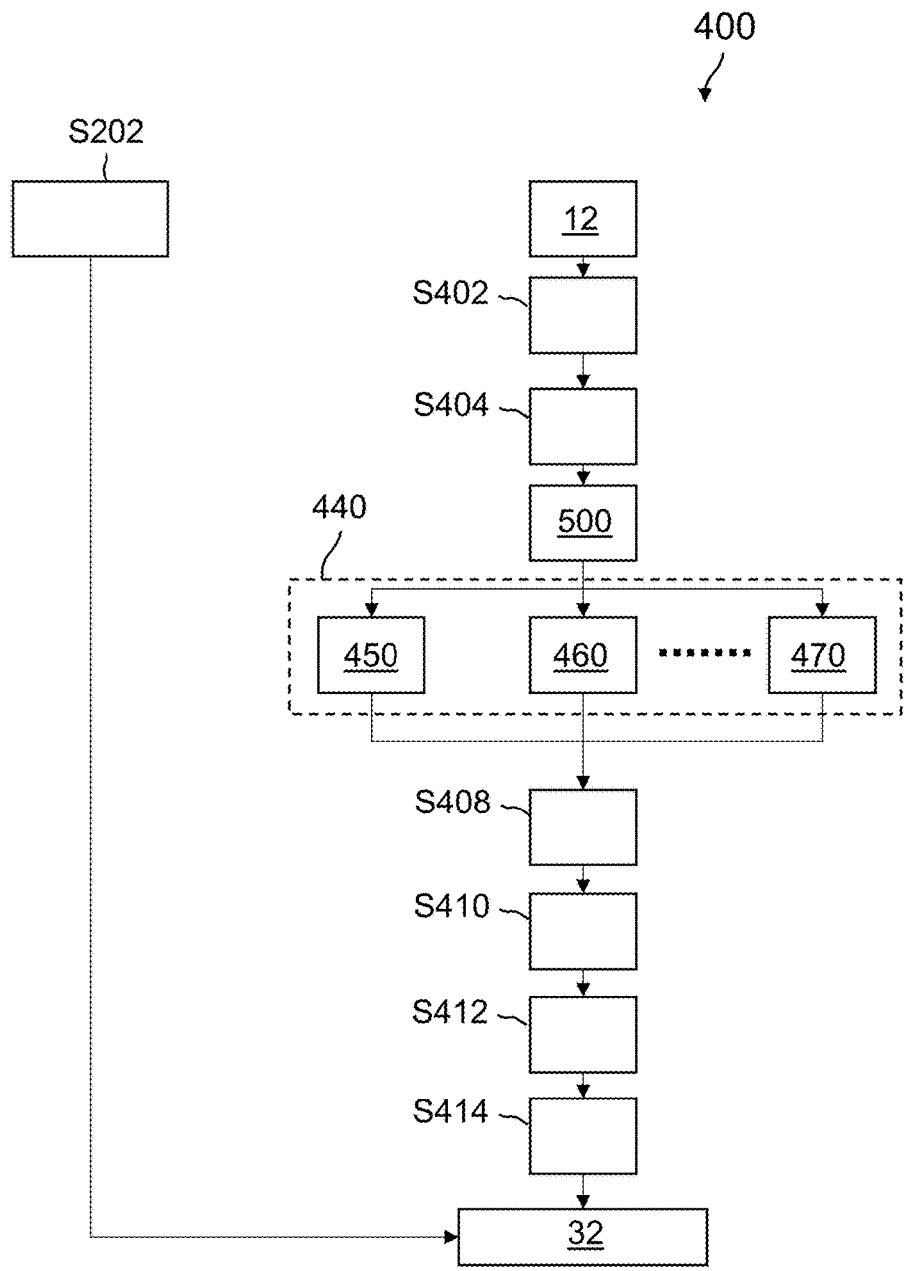

12: data trace
32: data memory
400: module generate database file
440: block evaluate signals by length
450: algorithm of machine learning method 1
460: algorithm of machine learning method 2
470: algorithm of machine learning method 3
500: module generating feature module
S202: identify sender S402: determine least significant bit
S404: generate signals of different lengths
S408: buffer data
S410: determine number of data traces for each signal
S412: summarize to profile
S414: evaluate which signals in data packet

Fig. 4

22: feature
40: time-dependent signal
500: feature generating module
S502: generate bit change frequency
S504: generate histogram values
S506: generate histogram derivatives
S508: other characteristics 32: data memory
42: virtual signal
50: first signal
60: second signal
62: assigned signal
70: buffer
700: module compare signals
720: block correlation
S702: change first signals
S704: change first signals
S706: select signals
S708: select signals
S710: determine similarity probability
S712: check equality
S714: check signal assignable
S716: determine factor, offset
S718: verification

METHOD FOR ASSIGNING ELECTRICAL SIGNALS IN A NETWORK

PRIOR ART

The invention relates to a method for assigning electrical signals in a network for electrical signals, in particular in a signal bus of a vehicle, and to a computer program product for assigning electrical signals in a network for electrical signals, in particular in a signal bus of a vehicle, and to a data processing system.

The control of drive units, for example in vehicles such as buses or trucks, is usually performed by electronic control units (ECU). These send data packets cyclically as so-called messages and thus control the operation of the engine, for example. These messages are usually sent via a controller area network (CAN bus). If, in the course of retrofitting, the powertrain is removed or replaced by another powertrain, some specific electronic control units are omitted. In order to operate without error, the vehicle's remaining ECUs need data from the removed ECUs, such as oil pressure or engine speed. If certain data is not sent, errors are reported. To prevent this, the removed ECUs can be simulated, for example. To be able to simulate the ECUs, it must be known where signals essential for operation, for example of the drive units, are located in the messages.

Another example is the door status of a vehicle. Here, for example, the air-conditioning system must be informed whether a door is open, as the air-conditioning system must then switch to recirculation so that the doors can be properly locked again.

Since no unified standard exists, this analysis must be performed for each vehicle model. Since the CAN bus of a vehicle can have well over a hundred different and unknown messages, a manual analysis is very time-consuming.

DISCLOSURE OF THE INVENTION

An object of the invention is to provide an improved method for assigning electrical signals in a network for electrical signals, in particular in a signal bus of a vehicle.

Another object is to provide a computer program product for executing such a method.

Another object is to provide a data processing system for carrying out such a method.

The objects are solved by the features of the independent claims. Favorable embodiments and advantages of the invention result from the further claims, the description and the drawing.

According to one aspect of the invention, a method is proposed for assigning electrical signals in a network for electrical signals, in particular in a signal bus of a vehicle, wherein at least the steps are performed of (i) generating first signals from data sources of the network as reference signals; (ii) generating second signals from the data sources of the network; (iii) assigning at least one of the second signals by comparing with at least one of the first signals and/or by comparing the at least one of the second signals with differences of the second signals in data traces for the second signal due to at least two known different network states;
   (iv) if a number of unassigned second signals after said assigning is equal to zero, terminating said assigning of said second signals; (v) as long as said number of unassigned second signals after said assigning is greater than zero, generating further first signals and second signals having modified known different network states and/or output conditions of said network and assigning by comparing at least one of said further second signals with at least one of said further first signals and/or by comparing said at least one of said further second signals with differences of said further second signals in data traces for said second signal based on at least two known different network states.

Generating, assigning, comparing can each be done in separate modules or blocks.

The method according to the invention allows an assignment of unknown electrical signals in a network, in particular a signal bus, especially a signal bus of a vehicle, in a very efficient way. The signal bus can be designed as a CAN bus, for example.

CAN buses are widely used in vehicles, for example. Other signal buses or networks can also be provided for routing signals. Likewise, the method is not tied to be used in vehicles.

Electrical signals on the network, especially in a network in a vehicle, can come from, for example, control units, signal generators, sensors, electronic components, and/or audio components. The signals link the functions of the individual components on the network to each other. Messages can transmit data packets, in particular signals, which can be addressed to specific components on the network, for example, or can be addressed to all components.

The functions of components on the network can only run error-free if certain signals from a component are responded to in an expected manner by an addressed component. If this expected reaction fails to occur, an error is generated, for example, or certain functions in components on the network are switched off. This error-free operation is advantageously made possible by the method according to the invention.

However, signals can also be used to exchange physical measured values or to transmit diagnostic data.

By sending simulated messages into a CAN bus as a signal bus, it is possible, for example, to renew drive units in commercial vehicles such as buses or trucks, e.g. to replace combustion engines with alternative drives, without affecting the function of the other components connected to the bus.

This means that components such as the electric rear axle, high-voltage battery, high-voltage auxiliary units, charging components, and the like can be integrated into a used vehicle and put into operation in a very short time.

The assignment of unknown signals in the network allows components to be connected to an otherwise unknown network and/or provides the network with the signals necessary for smooth operation.

For example, the assignment of unknown signals in the network enables signals from control units required in the network to be detected and control units, for example of a new powertrain, to be connected to the vehicle's network.

This implementation enables, for example, defined and secure communication of a new electric powertrain in a used or new vehicle that was previously equipped with an internal combustion engine. The process is independent of the vehicle type (bus, commercial vehicle or passenger car, or new vehicle or used vehicle).

However, the invention is not limited to this implementation, but also makes it possible to connect one or more new signal sources to an existing network and to ensure the safe functioning of the system with the network. For example, the method according to the invention can also be used to analyze the communication between sensors and actuators in the home automation sector or in the industrial sector, for example on a PLC bus.

In the method according to the invention, machine learning methods are used which analyze the unknown signals. For example, the methods neural networks, support vector machines (SVMs) and/or decision trees, e.g. for evaluating the lengths of data packets, can be used for this purpose.

The method is based on a defined procedure with which the data can be analyzed and assigned to features. Different machine learning methods are applied to the signals to decide which method is best suited for the corresponding problem.

This eliminates the need for time-consuming, manual programming when assigning unknown signals in the network. The method is process-safe and allows fulfillment of the requirements for functional safety of vehicles according to the ISO 26262:2018 standard from 2018.

The method advantageously offers, for example, a significant reduction in the development time of an aftermarket powertrain for a vehicle model. The invention allows the functional safety of electronics, control units, electronic systems and components to be maintained, in particular for safety-critical applications in vehicles.

According to an advantageous embodiment of the method, at least one time-independent data source and at least one time-dependent data source may be used as the data source. Time-independent data sources may include, for example: data memory, known database file of a known network, subscriber on the network, circuit diagram. Time-dependent data sources may include, for example: data trace, analog electrical voltage, diagnostic data, trigger input, network state.

In this way, available information can be used expediently to extract both first signals as reference signals and second signals from the data traces and to process them appropriately.

According to an advantageous embodiment of the method, virtual signals can be generated from a combination of first signals for comparison with at least one of the first signals, which are used for comparison with unassigned second signals. Virtual signals can be suitably generated from first signals, for example, on the basis of logical relationships of the network and/or by modification by means of mathematical operations, so as to be checked for similarity with second signals.

According to an advantageous embodiment of the method, at least the steps of (i) correlating data packets, in particular messages; (ii) generating database files; (iii) categorizing the second signals; (iv) storing the categorized second signals in the data memory can be performed for generating second signals.

These complex steps conveniently allow to generate second signals which can be identified and assigned with high probability by means of the following assignment steps. The correlation, generation as well as categorization is advantageously carried out in a respective module.

According to an advantageous embodiment of the method, the second signals can be determined from a measurement of data traces and/or analog voltages on the network. In particular, signals on data traces provide the basis for assignment for the second signals.

Signals due to analog voltages can additionally be used to identify second signals in order to increase the assignment probability.

According to an advantageous embodiment of the method, for correlating data packets at least the steps can be performed of (i) determining a probability for a similarity of data packets present on a data trace; (ii) creating a routing table; (iii) discarding duplicate data packets. Data packets, which are available in particular in the form of messages on data traces, can be checked for similarity in this way. In particular, duplicate data packets can be identified and discarded in this way, so that the number of unassigned second signals can be reduced.

According to an advantageous embodiment of the method, when generating a database file, features may be generated comprising at least a frequency of bit changes, a histogram of second signals, a histogram of time derivatives of the second signals, which features are stored in a buffer.

According to an advantageous embodiment of the method, when generating a database file with an algorithm of at least one machine learning method, it can be evaluated whether it is a second signal of a specified length.

Advantageously, for generating a data memory, each message can be divided into signals of different, predetermined lengths. Thus signal candidates are generated. For the signal candidates, features are generated which include at least a frequency of bit changes, a histogram of second signals, a histogram of time derivatives of the second signals.

Based on these features, the algorithm of at least one machine learning method can be used to evaluate whether the signal is of the specified length. The evaluation is stored in the buffer.

In addition, a profile of the second signals can be used to evaluate which second signals are present in a data packet. However, the profile can only be created once it has been determined that it is a second signal of a specified length.

Second signals can be advantageously evaluated for a wanted length of the signal based on the features. This testing and evaluation can advantageously be done with one of the machine learning methods.

According to an advantageous embodiment of the method, at least one of the methods of the type neural networks, support vector machines, decision tree can be used as at least one machine learning method. These methods represent very widely used machine learning methods, which can be used in a broad field and for which corresponding tools are also commercially available.

According to an advantageous embodiment of the method, the algorithm can be trained to recognize unassigned second signals in data traces based on the first signals. The recognition can advantageously be performed by means of the machine learning algorithm.

According to an advantageous embodiment of the method, the algorithm can be trained to generate a database file based on a profile of unassigned second signals using the first signals. Thus, an efficient generation of a database file based on a profile of unassigned second signals can be achieved.

According to an advantageous embodiment of the method, when categorizing the second signals by means of the algorithm, each second signal can be evaluated according to which signal type it is and, depending on the signal type, a data type can be determined by means of the features and the algorithm.

For example, "physical" or "logical" can be assigned as the signal type. For the data type, the data format "unsigned integer" or "signed integer" can be assigned, for example. In addition, a physical unit inherent in the second signal can be determined by means of the algorithm on the basis of data traces with specific network states and curve shapes.

As the unit of the second signals, for example, in the case of a signal of the signal type "physical", the physical unit can be assigned.

According to an advantageous embodiment of the method, the algorithm can be trained to categorize unassigned second signals based on the first signals. Thus, an efficient categorization of unassigned second signals can be achieved.

According to an advantageous embodiment of the method, the algorithm can be trained to determine an inherent physical unit of unassigned second signals based on the first signals. Thus, an efficient determination of an inherent physical unit of unassigned second signals can be achieved.

According to an advantageous embodiment of the method, when comparing signals by means of the algorithm, the probability of similarity between at least one of the second signals and at least one of the first signals or at least one of the virtual signals can be determined and, if the probability of similarity is high, an identity of the causative data source between the first signal or the virtual signal and the second signal can be checked. In this way, a similarity or even identity between a first signal or a virtual signal and a second signal can be detected very efficiently and thus the second signal can be assigned.

According to an advantageous embodiment of the method, when comparing the at least one of the second signals with differences of the second signals in data traces for the second signal based on at least two known, different network states, differences of the second signals in the at least two network states can be evaluated.

In this way, differences in signals between two network states can be effectively detected, for example, network states where signals have changed in only one data trace.

According to an advantageous embodiment of the method, at least one data transmission link, in particular a CAN bus, can be used as the network. CAN bus architectures are widely used in vehicles and represent the most commonly used network type. Messages are known in CAN networks as CAN messages. Data traces are known as CAN traces, among other things. Data traces contain signals depending on time, for example a diagnostic extract in csv files, or videos.

According to an advantageous embodiment of the method, the generation of a database file from second signals can be automated using the at least one machine learning algorithm.

In this way, manual recognition of the second signals can be advantageously dispensed with, so that a significant time saving can be achieved when assigning second signals on an unknown network.

According to another aspect of the invention, a computer program product is proposed for assigning electrical signals in a network for electrical signals, in particular in a signal bus of a vehicle, the computer program product comprising at least one computer-readable storage medium comprising program instructions executable on a computer system and causing the computer system to perform a method as described above.

At least the steps of (i) generating first signals from data sources of the network as reference signals; (ii) generating second signals from the data sources of the network; (iii) assigning at least one of the second signals by comparing with at least one of the first signals and/or by comparing the at least one of the second signals with differences of the second signals in data traces for the second signal due to at least two known different network conditions; (iv) if a number of unassigned second signals after assigning is equal to zero, terminating the assigning of the second signals; (v) as long as a number of unassigned second signals after said assigning is greater than zero, generating further first signals and second signals having modified known different network states and/or initial conditions of said network, and assigning by comparing at least one of said further second signals with at least one of said further first signals and/or by comparing said at least one of said further second signals with differences of said further second signals in data traces for said second signal based on at least two known different network states.

The computer program product advantageously serves to implement the method according to the invention. To avoid unnecessary repetition, reference is made to the description of the method.

According to another aspect of the invention, a data processing system for executing a data processing program comprising computer-readable program instructions is proposed for executing a method for assigning electrical signals in a network for electrical signals, in particular in a signal bus of a vehicle, in particular as described above.

The data processing system is advantageously used to carry out the method according to the invention. To avoid unnecessary repetition, reference is made to the description of the method.

DRAWING

Further advantages can be seen from the following description of the drawings. The figures show examples of embodiments of the invention. The figures, the description and the claims contain numerous features in combination. The skilled person will expediently also consider the features individually and combine them to form useful further combinations.

Figure 2:
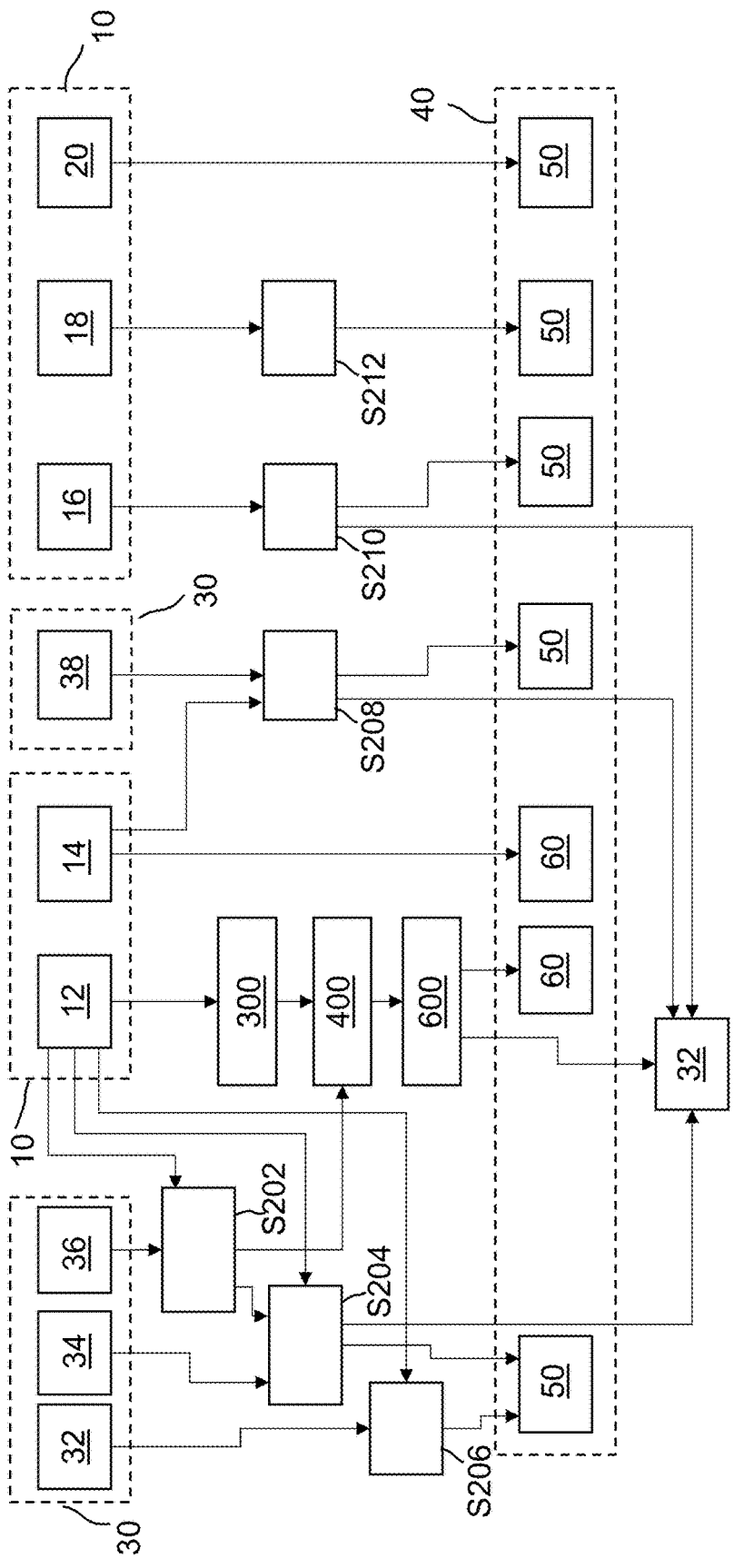
Figure 3:
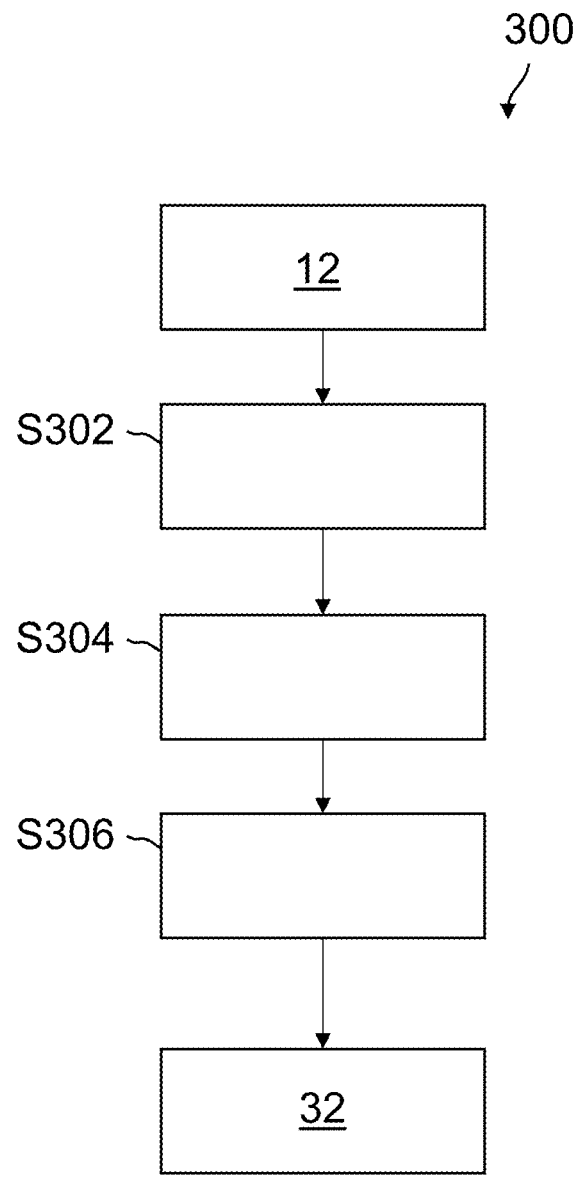
Figure 5:
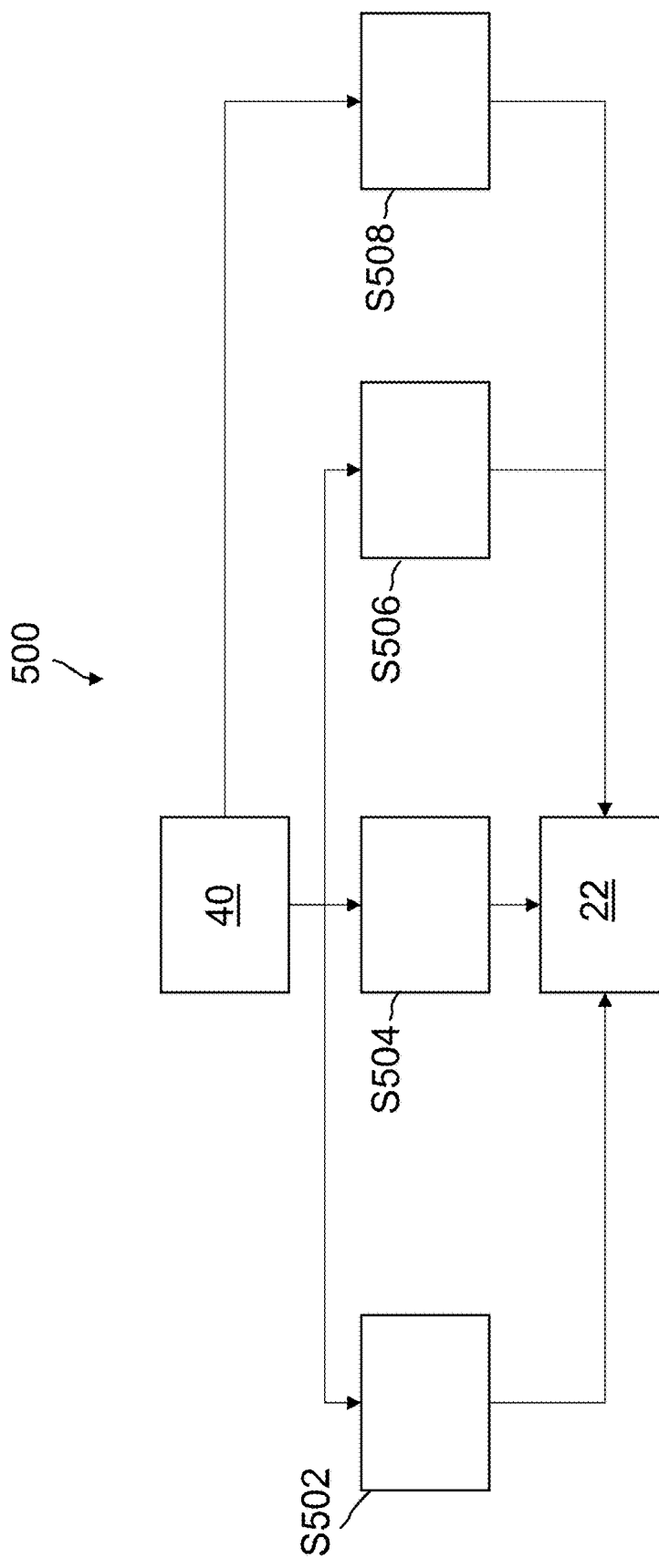
Figure 6:
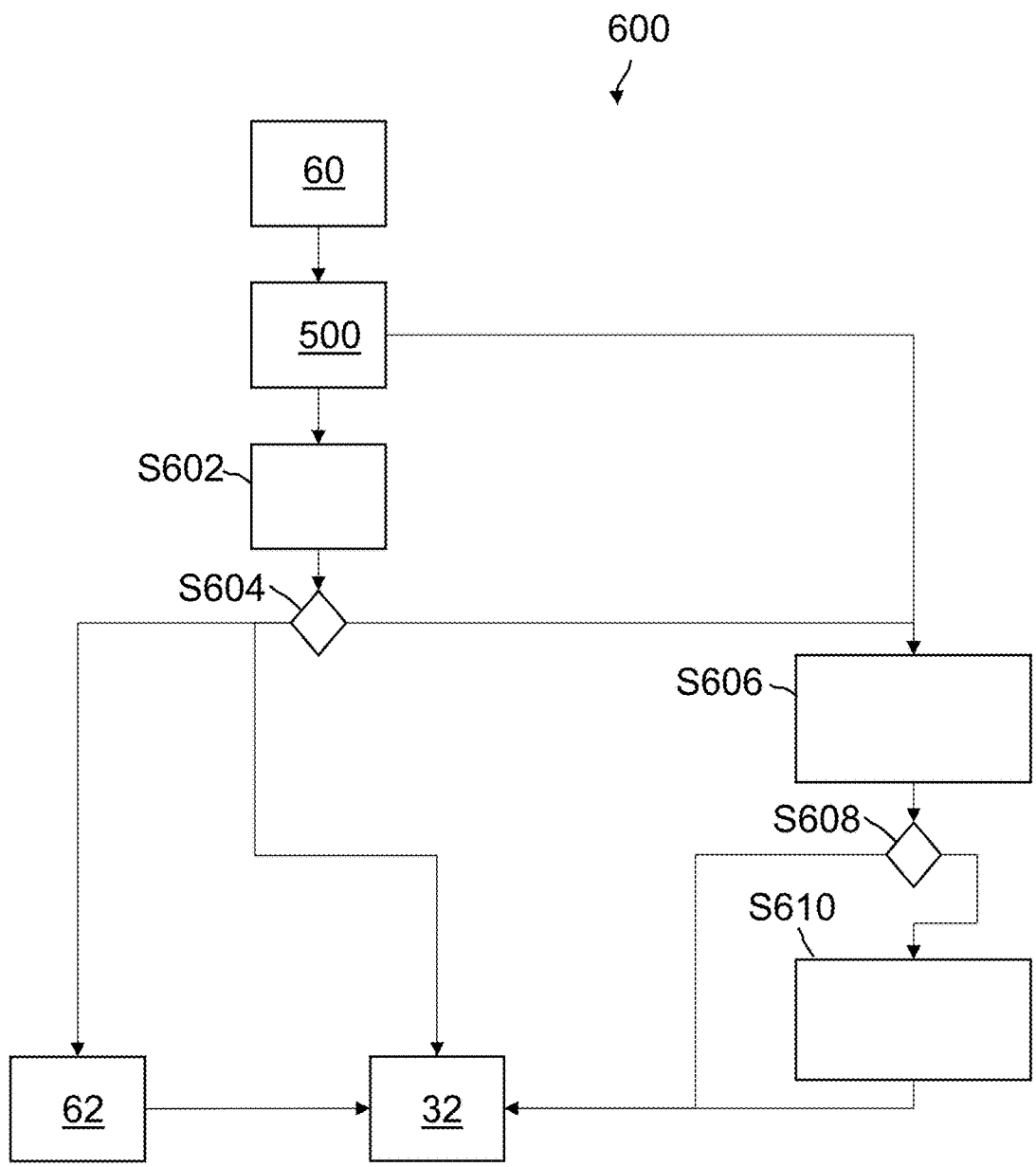
Figure 7:
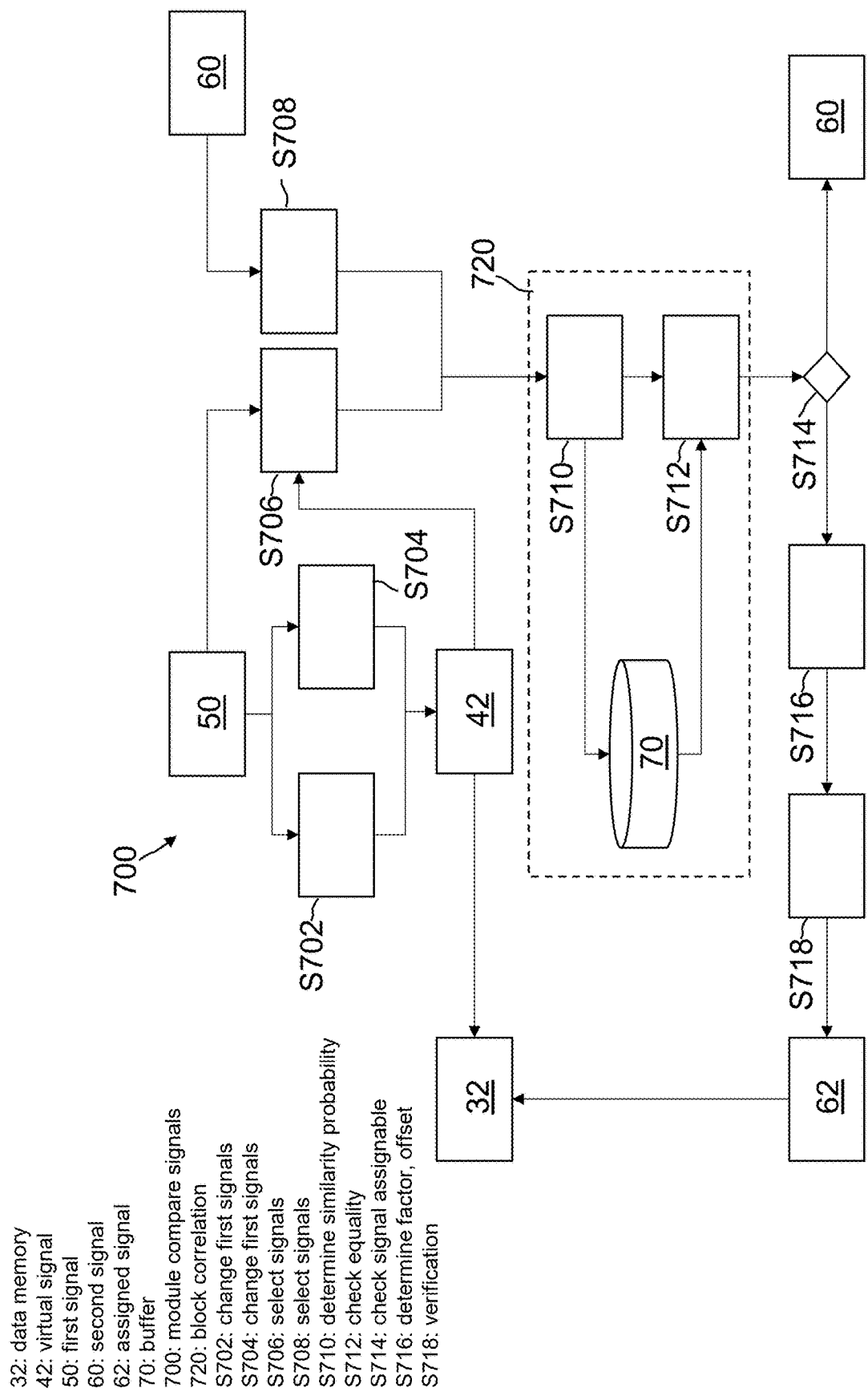
Figure 8:
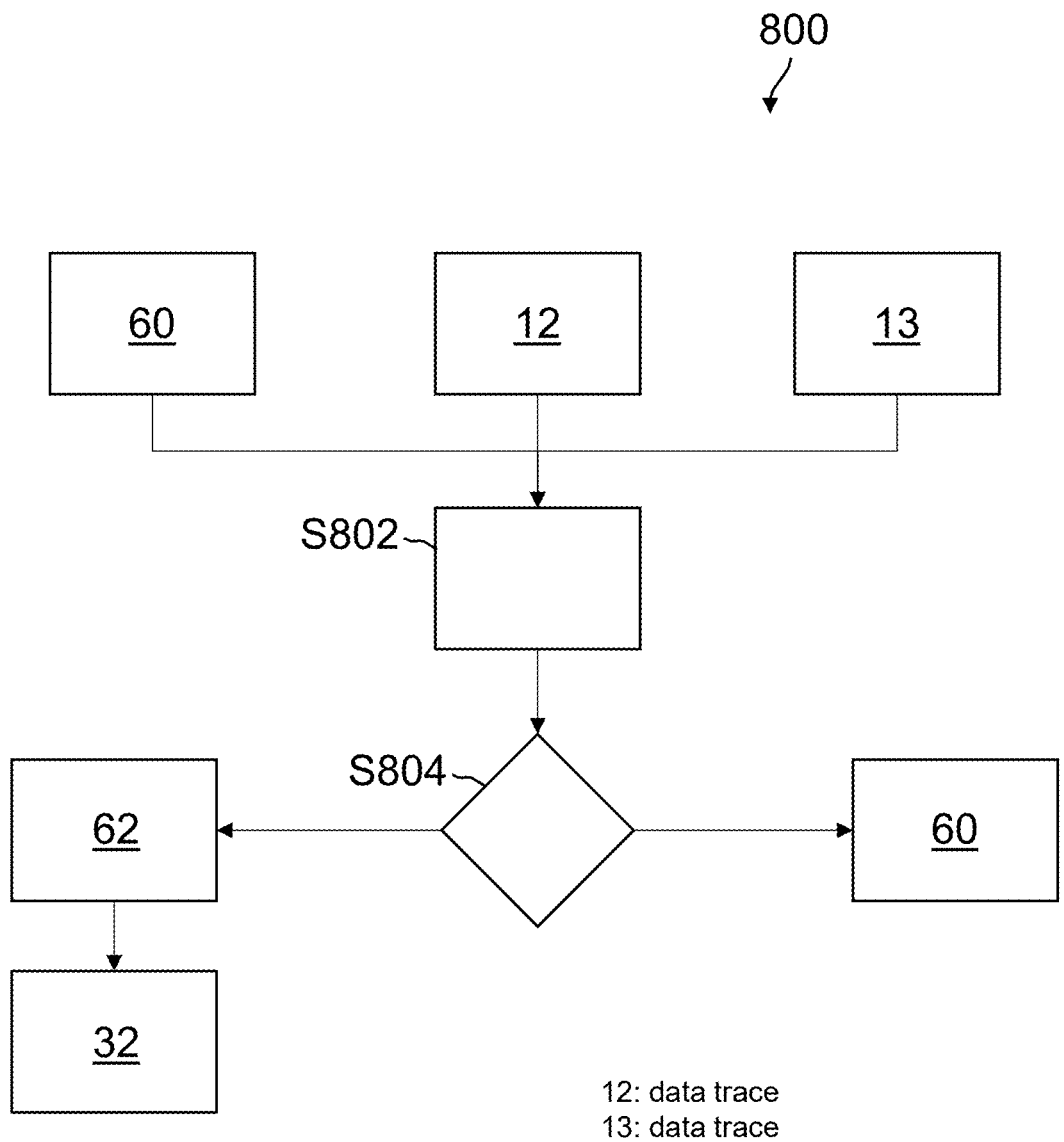

It is shown exemplary in:

FIG. 1 an overall sequence of the method according to the invention for allocating electrical signals in a network for electrical signals, in particular in a signal bus of a vehicle;

FIG. 2 a flowchart for generating first and second signals according to the method of the invention;

FIG. 3 a flowchart for correlating data packets according to the method of the invention;

FIG. 4 a flowchart for generating database files according to the method of the invention;

FIG. 5 a flowchart for generating features according to the method of the invention;

FIG. 6 a flowchart for categorizing signals according to the method of the invention;

FIG. 7 a flowchart for comparing signals according to the method of the invention; and FIG. 8 a flowchart for evaluating differences of second signals in data traces based on at least two known different network states according to the method according to the invention.

EMBODIMENTS OF THE INVENTION

In the figures, components of the same kind or having the same effect are numbered with the same reference signs. The figures show examples only and are not to be understood as limiting.

Directional terminology used in the following, with terms such as "left", "right", "above", "below", "before" "behind", "after" and the like, is merely for better understanding of the figures and is in no way intended to represent a limitation of generality. The components and elements shown, their design and use may vary in accordance with the considerations of a person skilled in the art and may be adapted to the particular applications.

FIG. 1 shows an overall sequence of the method according to the invention for assigning electrical signals 60 in a network for electrical signals 60, in particular in a signal bus, in particular of a vehicle. Several electronic components, for example control units, are connected to the network. The network may, for example, take the form of at least one CAN bus, such as is typically used in vehicles, in particular in the drive sector. However, it is understood that the method is not limited to the application to networks with CAN buses or networks in vehicles.

The method has at least the steps described below.

Signals and/or data from time-dependent data sources 10 of the network are preprocessed in step S100. Signals and/or data from time-independent data sources 30 of the network are preprocessed in step S102.

From the signals and/or data preprocessed in S100 and S102, first signals 50 are generated in the module 200 as reference signals 50. Further, second signals 60 are generated, which are unknown and cannot yet be fully assigned. The number of first signals 50, the reference signals 50, is denoted by $R_v$ and the number of unknown second signals 60 is denoted by $U_v$.

First signals 50 and second signals 60 are fed as input to block 900 for assigning the second signals 60. In module 700, at least one of the second signals 60 is compared to at least one of the first signals 50. Alternatively or additionally, in module 800, the at least one of the second signals 60 is compared to differences in the second signals 60 in data traces 12, 13 (FIG. 8) for the second signal 60 based on at least two known different network states 20.

The block 900 is performed once, whereby a number $U_n$ of unassigned second signals 60 after being assigned in the block 900 is less than or equal to a number $U_v$ of unassigned second signals 60 before being assigned in the block 900, and thereby a number Zn of assigned second signals 62 after being assigned in the block 900 is greater than or equal to a number $Z_v$ of assigned second signals 62 before being assigned in the block 900.

In step S106, it is checked whether the number $U_n$ of unassigned second signals 60 is zero after assigning. If this is the case, the assignment is terminated.

If the number $U_n$ of unassigned second signals 60 is greater than zero after assigning in block 900, a modification is made in step S104 by known different network states 20 (FIG. 2) and/or output conditions of the network before further first signals 50 and second signals 60 are generated in module 200. Thereafter, the block 900 for assigning the second signals 60 is performed again. In module 700, at least one of the further second signals 60 is compared to at least one of the further first signals 50, while in module 800, the at least one of the further second signals 60 is compared to differences of the further second signals 60 in data traces 12, 13 for the second signal 60 due to at least two known different network conditions 20.

If the number $U_n$ of unassigned second signals 60 after assigning in block 900 is zero when interrogated in step S106, then the assignment of the unknown second signals 60 is complete and the process is terminated in step S108.

The assigning block 900 of second signals 60 can be automated, so that manual input of information can be largely eliminated. As a result, the time required to assign unknown second signals 60 in a network can be significantly reduced.

FIG. 2 shows a flowchart for generating first and second signals 50, 60 in module 200 of the method.

Data sources 10, 30 for generating first and second signals 50, 60 may include at least one time-independent data source 30 from the group of the type: data memory 32, known database file 34 of a known network, subscriber 36 on the network, circuit diagram 38. Further, the data sources 10, 30 may comprise at least one time-dependent data source 10 from the group of the type: data trace 12, analog electrical voltage 14, diagnostic data 16, trigger input 18, network state 20.

Diagnostic data 16 may be provided via the network or via files, such as a data trace linked to a data memory 32. Trigger inputs 18 may be provided via a manual input when a network condition has changed, such as when a vehicle door has been operated.

First and second signals 50, 60 are provided as time-dependent signals 40.

For example, a first signal 50 may be generated in step S206 from an entry in a data memory 32 associated with a data trace 12.

Senders of a data packet, in particular of a message, can be identified in step S202 via inputs from subscribers 36 on the network as well as via data from data traces 12, for example by specifically disconnecting control units connected to the network from the network using a CAN router or the like.

In step S204, verification of potentially similar signals 50, 60 from an already known model from already known database files 34 and the new model is performed. First signals 50 are generated using the database file 34 and data traces 12 with similar network states, a known model and a new model. By comparing the signal traces and their origin (for example, from a control unit), a first signal 50 can be generated as a reference signal 50 if a match is found and stored in the data memory 32.

Other first signals 50 may be generated via inputs of analog voltages 14, for example oscillograms, measured voltage levels from a measurement box, and circuit diagrams 38. In step S208, this is done by determining which one of the signals represents the voltage, for example.

Diagnostic data 16 is decoded and processed in step S210 so as to be provided as a further first signal 50.

Trigger inputs 18 are also used to generate first signals 50. Signals 50 may be generated for this purpose, in the case of a vehicle CAN bus, for example, via an ABS active signal, messages in the electronic dash board, a door OPEN/CLOSED signal.

A network state 20 may be provided directly as a first signal 50.

To generate second signals 60, at least the following steps are performed.

In module 300, data packets, in particular messages, are correlated on the basis of data traces 12. Data packets can in particular be formed as CAN messages in a CAN network.

In module 400, database files 34 are generated from messages from module 300 and identified senders of messages from step S202.

In the next step, second signals 60 are categorized in module 600.

The categorized second signals 60 are stored in the data memory 32.

FIG. 3 shows a flowchart for correlating data packets in module 300 (FIG. 2) of the method.

Data packets are obtained via data traces 12. Data packets can, in particular, take the form of CAN messages in a CAN network.

In step S302, an algorithm is first used to determine a probability 70 for a similarity of data packets present on the data trace 12.

In step S304, a routing table is then created based on the probabilities determined above. A buffer contains the similarity probability with each other data packet for each data packet. The routing table includes messages which occur at least twice in the data trace 12.

Then, in step S306, the data packets are checked for duplicates and duplicate data packets are discarded.

The routing table is stored in data memory 32.

FIG. 4 shows a flowchart for generating database files in module 400 (FIG. 2) of the method.

The module 400 is based on input of data packets from data traces 12, in particular CAN messages on so-called CAN traces in the case of a CAN network, and can run automated with at least one algorithm 450, 460, 470 of at least one machine learning method.

As a machine learning method, at least one of the methods of the neural network type, support vector machines, decision tree, can be advantageously used.

In the first step S402 the so-called "least significant bits" of each data packet are determined, for example via a bit change frequency, to find out where signals 60 start.

In the next step S404, second signals 60 of different lengths are generated for each existing data packet.

Thereafter, features 22 are generated in the module 500 that include at least a frequency of bit changes, a histogram of second signals 60, a histogram of time derivatives of the second signals 60. The features 22 are stored in a buffer.

Subsequently, in block 440, the generated second signals 60 are evaluated according to whether the signal 60 is a signal 60 of the wanted length. Various machine learning methods 450, 460, 470 can be used for this purpose.

In step S408, the data is stored in a buffer.

In the following step S410, for each length of a signal 60, for each bit, each network state, and each machine learning method 450, 460, 470, it is determined in how many data traces 12 a signal 60 was found at that bit with that method 450, 460, 470 and that network state.

In the next step S412 this information is combined to a profile.

In step S414, the machine learning method 450, 460, 470 is used to evaluate which signals 60 are present in a data packet based on the profile.

This information is stored in the data memory 32 together with the information about the signal origins determined in step S202 in FIG. 2 about the identification of the senders of data packets.

FIG. 5 shows a flowchart for generating features 22 in module 500 (FIG. 4) of the method.

In module 500, features 22 are generated for time-dependent signals 40, which may be first and second signals 50, 60 (see FIG. 2).

For this purpose, a frequency of bit changes is generated in step S502, which indicates how often a bit of a signal 50, 60 has changed value.

In step S504, a histogram of the values of signals 60 is generated, and in step S506, a histogram of time derivatives of signals 60 is generated. In step S508, other characteristics, such as a difference of bit changes, or a status of whether the bit has ever toggled, may be added.

The features 22 are stored in the buffer.

FIG. 6 shows a flowchart for categorizing second signals 60 in module 600 (FIG. 2) of the method.

For unknown second signals 60, features 22 are first generated in module 500 as described in FIG. 5.

Thereafter, in step S602, using the machine learning method 450, 460, 470, each second signal 60 is evaluated based on the feature 22 as to which signal type it is. The signal type can be, for example, "physical", "logical", a counter "counter", cyclic redundancy check "CRC".

Depending on the signal type, branching takes place in step S604.

In the case of the "counter" or "CRC" type, the second signal 60 is directly classified under associated second signals 62 and stored in the data memory 32.

In the case of the "Logical" signal type, the second signal 60 is stored directly in the data memory 32.

In the case of the signal type "physical", in step S606 every second signal 60 is evaluated by means of the machine learning method 450, 460, 470 on the basis of the feature 22 according to which data type it is. For example, the data may be in "unsigned integer" or "signed integer" format.

After that, step S608 still checks whether a specific network state 20 is available.

If so, in step S610, a physical unit inherent to the second signal 60 is determined using the machine learning method 450, 460, 470 based on data traces 12, 13 having specific states 20 and curve shapes.

Thereafter, the second signals 60 are stored in the data memory 32.

If no specific network state 20 is available, signals 60 are stored directly in data memory 32.

FIG. 7 shows a flowchart for comparing signals 50, 60 in module 700 of the method.

In step S702, first signals 50 are modified as reference signals on the basis of logical relationships. Logic diagrams, physical conditions, for example, can be used for this purpose.

In step S704, first signals 50 may be modified, for example, by undersampling, low-pass filtering, mathematical operations, bit shifts.

By means of both steps S702 and S704, virtual signals 42 are generated from the first signals 50, which are stored in the data memory 32.

First signals 50 and virtual signals 42 are selected and timed in step S706 and, together with second signals 60, which are also selected and timed in step S708, serve as input to a block 720 for determining a correlation.

At block 720, a probability of similarity between at least one of the second signals 60 and at least one of the first signals 50 and/or the virtual signal 42 is determined at step S710. The probability for the similarity is stored in the buffer 70.

If there is a high probability of similarity, an identity between the first signal 50 and/or the virtual signal 42 and the second signal 60 is checked in step S712.

If the signal 60 is assignable, which is checked in step S714, a factor and an offset are optionally determined in step S716.

In step S718, verification is performed with a matching network state. Then, if the verification is successful, the signal 60 is stored under associated second signals 62 in the data memory 32.

If the signal 60 is not assignable in step S714, it is further routed among unassigned signals 60.

FIG. 8 shows a flowchart for evaluating differences of second signals 60 in data traces 12, 13 based on at least two known different network states 20 according to the method of the invention.

According to the diagram shown in the Figure, when the at least one of the second signals 60 is compared in the module 800 to differences of the second signals 60 in data traces 12, 13 for the second signal 60, differences of the second signals 60 in the at least two network states 20 are evaluated based on at least two known different network states 20.

For this purpose, inputs of at least a second signal 60, as well as data traces 12, 13 from respectively different network states 20, are introduced into the evaluation step S802. The differences of the signals 60 in both network states 20, for example states which have only changed in one data trace 12, 13, are evaluated.

In step S804, it is then checked whether the signal 60 can be assigned. If this is the case, the signal 60 is classified under assigned signals 62 and stored in the data memory 32.

If this is not the case, the signal 60 will continue under unassigned signals 60.

REFERENCE NUMERALS

- 10 time-dependent data sources
- 12 data trace
- 13 data trace
- 14 analog voltage
- 16 diagnostic data
- 18 trigger input
- 20 network state
- 22 feature
- 30 time-independent data sources
- 32 data memory
- 34 database file
- 36 subscriber on signal bus
- 38 circuit diagram
- 40 time-dependent signal
- 42 virtual signal
- 50 first signal
- 60 second signal
- 62 assigned signal
- 70 buffer
- 200 module generate signals
- 300 module correlation of data packets
- 400 module generate database file
- 440 block evaluate signals by length
- 450 algorithm of a machine learning method 1
- 460 algorithm of machine learning method 2
- 470 algorithm of machine learning method 3
- 500 module generating feature module
- 600 module categorize signals
- 700 module compare signals
- 720 block correlation
- 800 module comparison between states
- 900 block assign
- S100 preprocessing
- S102 preprocessing
- S104 modify network state
- S106 check if unassigned signals are present
- S108 end
- S202 identify sender
- S204 verification
- S206 generate signals
- S208 compare with schematic
- S210 decoding
- S212 generate signals
- S302 determine similarity probability
- S304 create routing table
- S306 discard duplicate data packets
- S402 determine least significant bit
- S404 generate signals of different lengths
- S408 buffer data
- S410 determine number of data traces for each signal
- S412 summarize to profile
- S414 evaluate which signals in data packet
- S502 generate bit change frequency
- S504 generate histogram values
- S506 generate histogram derivatives
- S508 other characteristics
- S602 evaluate signal type
- S604 check signal type
- S606 evaluate data type
- S608 check data type
- S610 determine unit
- S702 change first signals
- S704 change first signals
- S706 select signals
- S708 select signals
- S710 determine similarity probability
- S712 check equality
- S714 check signal assignable
- S716 determine factor, offset
- S718 verification
- S802 determine differences
- S804 check signal assignable

The invention claimed is:

1. A method for assigning electrical signals in a network for electrical signals, comprising the steps of:
   (i) generating first signals from data sources of the network as reference signals;
   (ii) generating second signals from the data sources of the network;
   (iii) assigning at least one of the second signals by comparing the at least one of the second signals to at least one of the first signals and by comparing the at least one of the second signals with differences in the second signals in data traces for the second signal based on at least two known, different network states;
   (iv) wherein, subsequent to the assigning, generating further first signals and further second signals with modified known different network states and output conditions of the network, and assigning at least one of the further second signals by comparing the at least one of the further second signals with at least one of the further first signals and by comparing the at least one of the further second signals with differences of the further second signals in data traces for the second signal based on at least two known different network states,
   (v) continue to assign the second signals until no more unassigned second signal is found, and terminating the assigning of second signal process;
   wherein for steps of comparing with at least one of the first signals, virtual signals are generated from a combination of first signals which are used for comparison with unassigned second signals.

2. The method according to claim 1, wherein at least one time-independent data source selected from the group consisting of: data memory, known database file of a known network, subscriber on the network, circuit diagram, and
   at least one time-dependent data source selected from the group of the type: data trace, analog electrical voltage, diagnostic data, trigger input, network state is used as data source.

3. The method according to claim 1, wherein for generating second signals, the method further comprises:
   (i) correlating data packets;
   (ii) generating database files;
   (iii) categorizing the second signals; and (iv) storing the categorized second signals in a data memory.

4. The method according to claim 3, wherein the second signals are determined from a measurement of data traces and analog voltages on the network.

5. The method according to claim 3, wherein for correlating data packets, the method further comprises:
(i) determining a probability for a similarity of data packets present on a data trace;
(ii) creating a routing table, wherein the routing table includes messages which occur at least twice in the data trace; and
(iii) discarding duplicate data packets.

6. The method according to claim 3, wherein, when generating a database file, features are generated, the features comprising at least a frequency of bit changes, a histogram of second signals, a histogram of time derivatives of the second signals, which features are stored in a buffer.

7. The method of claim 3,
wherein, when generating a database file with an algorithm of at least one machine learning method, it is evaluated whether it is a second signal of a specified length, or
wherein, when generating a database file with an algorithm of at least one machine learning method, it is evaluated whether it is a second signal of a specified length and, based on a profile of the second signals, it is evaluated which second signals are present in a data packet.

8. The method according to claim 7, wherein as at least one machine learning method at least one of the methods of the type neural networks, support vector machines, decision tree, is used.

9. The method of claim 7, wherein the algorithm is trained to detect unassigned second signals in data traces based on the first signals.

10. The method of claim 7, wherein the algorithm is trained on generating a database file based on a profile of unassigned second signals using the first signals.

11. The method according to claim 7, wherein, when categorizing the second signals by means of the algorithm, each second signal is evaluated according to which signal type it is and, depending on the signal type, a data type is determined by means of the features and the algorithm, and wherein a physical unit inherent in the second signal is determined by means of the algorithm on the basis of data traces with specific network states and curve shapes.

12. The method of claim 7, wherein the algorithm is trained to categorize unassigned second signals based on the first signals.

13. The method of claim 7, wherein the algorithm is trained to determine an inherent physical unit of unassigned second signals based on the first signals.

14. The method according to claim 7, wherein, when comparing signals, the probability of similarity between at least one of the second signals and at least one of the first signals or at least one of the virtual signals is determined and, if the probability of similarity is high, an identity of the causative data source between the first signal or the virtual signal and the second signal is checked.

15. The method according to claim 1, wherein, when comparing the at least one of the second signals to differences of the second signals in data traces for the second signal based on at least two known different network states, differences of the second signals in the at least two network states are evaluated.

16. The method according to claim 1, wherein at least one data transmission link is used as the network.

17. The method of claim 7, wherein generating a database file from second signals using the algorithm is automated.

18. A computer program product for assigning electrical signals in a network for electrical signals, the computer program product comprising at least one non-transitory computer-readable storage medium storing program instructions executable on a computer system and causing the computer system to execute a method comprising the steps of:
(i) generating first signals from data sources of the network as reference signals;
(ii) generating second signals from the data sources of the network;
(iii) assigning at least one of the second signals by comparing the at least one of the second signals to at least one of the first signals and by comparing the at least one of the second signals with differences in the second signals in data traces for the second signal based on at least two known, different network states;
(iv) wherein, subsequent to the assigning,
generating further first signals and further second signals with modified known different network states and output conditions of the network, and
assigning at least one of the further second signals by comparing the at least one of the further second signals with at least one of the further first signals and by comparing the at least one of the further second signals with differences of the further second signals in data traces for the second signal based on at least two known different network states,
(v) continue to assign the second signals until no more unassigned second signal is found, and terminating the assigning of second signal process;
wherein for steps of comparing with at least one of the first signals, virtual signals are generated from a combination of first signals which are used for comparison with unassigned second signals.

19. A data processing system for executing a data processing program comprising memory storing program instruction and one or more processor for executing the instructions to perform a method for assigning electrical signals in a network for electrical signals; said method comprising steps of:
(i) generating first signals from data sources of the network as reference signals;
(ii) generating second signals from the data sources of the network;
(iii) assigning at least one of the second signals by comparing the at least one of the second signals to at least one of the first signals and by comparing the at least one of the second signals with differences in the second signals in data traces for the second signal based on at least two known, different network states;
(iv) wherein, subsequent to the assigning,
generating further first signals and further second signals with modified known different network states and output conditions of the network, and
assigning at least one of the further second signals by comparing the at least one of the further second signals with at least one of the further first signals and by comparing the at least one of the further second signals with differences of the further second signals in data traces for the second signal based on at least two known different network states, (v) continue to assign the second signals until no more unassigned second signal is found, and terminating the assigning of second signal process;
wherein for steps of comparing with at least one of the first signals, virtual signals are generated from a combination of first signals which are used for comparison with unassigned second signals.

* * * * *